(12) United States Patent
Anderson et al.

(10) Patent No.: US 8,484,496 B2
(45) Date of Patent: Jul. 9, 2013

(54) METHOD AND SYSTEM FOR THERMAL MANAGEMENT OF BATTERY CHARGING CONCURRENCIES IN A PORTABLE COMPUTING DEVICE

(75) Inventors: Jon James Anderson, Boulder, CO (US); Francis Ngai, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 125 days.

(21) Appl. No.: 13/193,901

(22) Filed: Jul. 29, 2011

(65) Prior Publication Data
US 2012/0272078 A1 Oct. 25, 2012

Related U.S. Application Data

(60) Provisional application No. 61/478,163, filed on Apr. 22, 2011.

(51) Int. Cl.
*G06F 1/26* (2006.01)
*G06F 1/32* (2006.01)

(52) U.S. Cl.
USPC ......................................................... 713/320

(58) Field of Classification Search
None
See application file for complete search history.

(56) References Cited

U.S. PATENT DOCUMENTS

| | | | |
|---|---|---|---|
| 6,795,781 B2 | 9/2004 | Aldridge et al. | |
| 7,117,114 B2 | 10/2006 | Arabi et al. | |
| 7,734,440 B2 | 6/2010 | Hattis | |
| 8,169,195 B1 * | 5/2012 | Chait et al. | 320/152 |
| 2006/0063555 A1 | 3/2006 | Robbins | |
| 2006/0064999 A1 * | 3/2006 | Hermerding et al. | 62/259.2 |
| 2007/0220293 A1 | 9/2007 | Takase | |
| 2009/0251108 A1 | 10/2009 | Chao et al. | |
| 2009/0278506 A1 * | 11/2009 | Winger et al. | 320/160 |
| 2009/0322150 A1 | 12/2009 | Cline et al. | |
| 2012/0110352 A1 * | 5/2012 | Branover et al. | 713/300 |

FOREIGN PATENT DOCUMENTS

EP 2003762 A2 12/2008

OTHER PUBLICATIONS

International Search Report and Written Opinion—PCT/US2012/033204—ISA/EPO—Sep. 27, 2012.

* cited by examiner

*Primary Examiner* — Thomas Lee
*Assistant Examiner* — Zhipeng Wang
(74) *Attorney, Agent, or Firm* — Nicholas A. Cole

(57) ABSTRACT

A method and system for reducing thermal load by monitoring temperatures within a portable computing device and, based on those temperatures, controlling a battery charge function are disclosed. The method includes monitoring a power management integrated circuit ("PMIC") to determine if it is generating excess thermal energy that is contributory to an elevated temperature in a physically proximate application specific integrated circuit ("ASIC"). If so, and if the excess thermal energy is attributable to an ongoing battery recharge operation executed by the PMIC, a thermal policy manager module may execute a thermal mitigation technique algorithm to override the PMIC battery recharge function. One exemplary thermal mitigation technique may include a reduction of current sent to the battery, thus slowing the charge cycle and reducing the generation of excess thermal energy.

20 Claims, 12 Drawing Sheets

400

NORMAL STATE —305

- NORMAL MONITORING/POLLING/INTERRUPTS FROM THERMAL SENSORS
- NO THERMAL MITIGATION TECHNIQUE(S) APPLIED

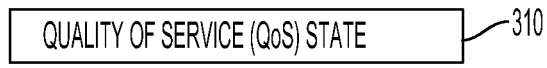
QUALITY OF SERVICE (QoS) STATE —310

- MORE RAPID MONITORING/POLLING/INTERRUPTS FROM THERMAL SENSORS
- START APPLYING THERMAL MITIGATION TECHNIQUE(S) BUT WITH OBJECTIVE TO MAINTAIN HIGHEST PERFORMANCE AND LITTLE OR NO PERCEPTION IN QUALITY OF SERVICE TO OPERATOR OF DEVICE

SEVERE STATE —315

- CONTINUOUS MONITORING/POLLING/INTERRUPTS FROM THERMAL SENSORS
- APPLY MORE AGGRESSIVE THERMAL MITIGATION TECHNIQUE(S) AND/OR ADDITIONAL THERMAL MITIGATION TECHNIQUES WITH PROBABLE PERCEIVABLE DEGRADATION OF PERFORMANCE BY OPERATOR OF DEVICE
- REDUCE POWER TO DEVICES (AMPLIFIERS, PROCESSORS)
  EXTENSIVE REALLOCATION OF PROCESSING LOADS
  MANIPULATE CURRENT FLOW INTO DEVICE
  OVERRIDE BATTERY FUNCTION ON PROXIMATE DEVICE

CRITICAL STATE —320

- SHUT DOWN NON-ESSENTIAL DEVICES!!
- MAINTAIN ONLY E911 AND GPS FUNCTIONS

*FIG. 7*

|  | Policy State 1 | Policy State 2 | Policy State 3 | Policy State 4 |
|---|---|---|---|---|
| Threshold Temp. of CPU | 55 C | 65 C | 75 C | > 85 C |
| Clearing Temp. of CPU | 53 C | 62 C | 70 C | 77 C |
| Mitigation Measure | CPU at full processing speed | CPU at 1/2 speed and battery charging current reduced | CPU 1/3 speed, charge aborted and display dimmed | Complete Shutdown |

FIG. 11

METHOD AND SYSTEM FOR THERMAL MANAGEMENT OF BATTERY CHARGING CONCURRENCIES IN A PORTABLE COMPUTING DEVICE

PRIORITY AND RELATED APPLICATIONS

This patent application claims priority under 35 U.S.C. §119(e) to U.S. Provisional Patent Application Ser. No. 61/478,163 filed on Apr. 22, 2011, entitled, "METHOD AND SYSTEM FOR THERMAL MANAGEMENT OF BATTERY CHARGING CONCURRENCIES IN A PORTABLE COMPUTING DEVICE," the entire contents of which are hereby incorporated by reference.

DESCRIPTION OF THE RELATED ART

Portable computing devices (PCDs) are becoming necessities for people on personal and professional levels. These devices may include cellular telephones, portable digital assistants (PDAs), portable game consoles, palmtop computers, and other portable electronic devices.

One unique aspect of PCDs is that they typically do not have active cooling devices, like fans, which are often found in larger computing devices like laptop and desk top computers. Instead of using fans, PCDs may rely on the spatial arrangement of electronic packaging so that two or more active and heat producing devices are not positioned in close proximity to one another. When two or more heat producing devices are not placed in close proximity to one another, then usually their operation does not negatively impact each other and any other electronics that may surround them. Many PCDs may also rely on passive cooling devices such as heat sinks to manage thermal energy among the electronics forming a respective PCD.

However, the spatial arrangement of electronic packaging and passive cooling devices, like heatsinks, are sometimes not adequate enough to prevent a PCD from reaching critical temperatures. Such critical thermal temperatures may cause permanent damage to the electronics within a respective PCD. Currently, when a PCD approaches a critical temperature, the operating system is designed to shut down most of the electronics generating the thermal energy in order to cool the PCD. While shutting down electronics may be effective to avoid critical temperatures that may cause permanent damage, such drastic measures directly impact performance of the PCD and may render a PCD useless with respect to its functionality when such measures are taken.

One particularly common use case that lends itself to dangerous thermal energy generation in a PCD involves simultaneous processing of high demand computational applications, such as video or gaming applications, with an ongoing recharge of the PCD battery. The thermal energy dissipated from the charging circuitry can significantly add to the thermal burden of the computational processors, especially when the charging circuitry is in close proximity to the processing circuitry.

Accordingly, what is needed in the art is a method and system for reducing thermal loads of a PCD when high demand computational applications are being run simultaneously with a battery recharge cycle, with minimal impact on user experience.

SUMMARY OF THE DISCLOSURE

A method and system for reducing thermal load by monitoring temperatures within a portable computing device and, based on those temperatures, controlling a battery charge function are disclosed. The method includes monitoring a temperature of the portable computing device and determining if the temperature has reached a first temperature threshold condition. This first temperature threshold condition may be comprised within any one of a plurality of thermal policy states, in which each thermal policy state may dictate or require any combination of various thermal mitigation techniques, including override of default battery recharge functions. The thermal policy states may be associated with temperature ranges or other values that may indicate thermal loading of an application specific integrated circuit within a portable computing device. If a first temperature threshold condition associated with the application specific integrated circuit is detected, then a temperature reading associated with a physically proximate power management integrated circuit ("PMIC") is read. If it is determined that the power management integrated circuit is generating excess thermal energy that is contributory to the first temperature threshold being reached, such as due to an ongoing battery recharge operation executed by the PMIC, a thermal policy manager module may execute a thermal mitigation technique algorithm to override the PMIC battery recharge function. One exemplary thermal mitigation technique may include a reduction of current sent to the battery, thus slowing the charge cycle and reducing the generation of excess thermal energy.

BRIEF DESCRIPTION OF THE DRAWINGS

In the figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

FIG. 7 is a diagram illustrating exemplary thermal mitigation techniques that may be applied or ordered by the thermal policy manager;

FIG. 11 is a table illustrating exemplary thermal mitigation measures that may be implemented as a result of a temperature threshold within a PCD being reached.

DETAILED DESCRIPTION

Figure 1:
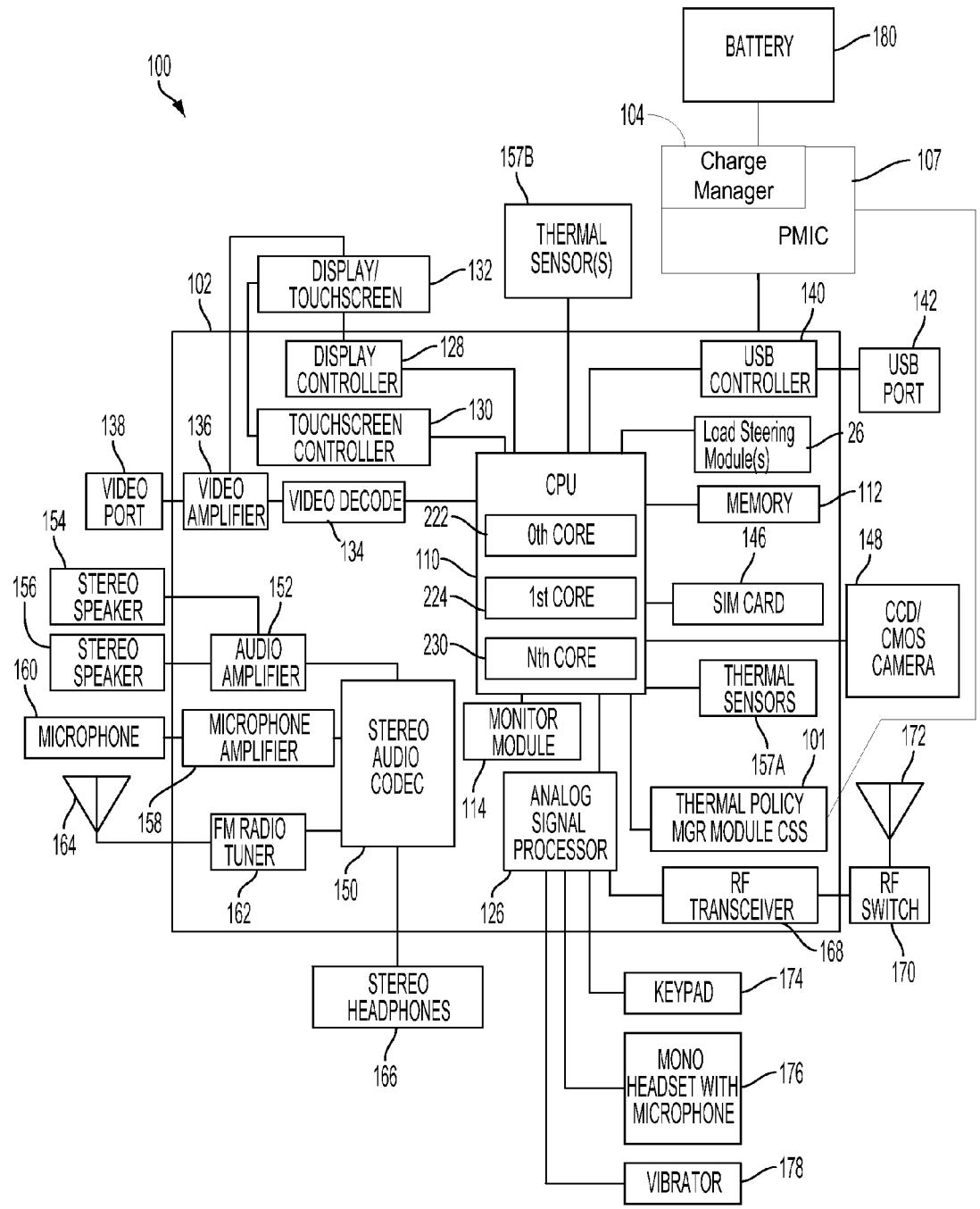
FIG. 1 is a functional block diagram illustrating an embodiment of a portable computing device (PCD)

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone," "wireless communication device," and "wireless handset" are used interchangeably. With the advent of third generation ("3G") and fourth generation ("4G") wireless technology, greater bandwidth availability has enabled more portable computing devices with a greater variety of wireless capabilities.

In this description, the terms "central processing unit ("CPU")," "digital signal processor ("DSP")," and "chip" are used interchangeably.

In this description, it will be understood that the terms "thermal" and "thermal energy" may be used in association with a device or component capable of generating or dissipating energy that can be measured in units of "temperature." Consequently, it will be further be understood that the term "temperature," with reference to some standard value, envisions any measurement that may be indicative of the relative warmth, or absence of heat, of a "thermal energy" generating device or component. For example, the "temperature" of two components is the same when the two components are in "thermal" equilibrium.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") wireless technology, have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, and a laptop computer with a wireless connection, among others.

In this description, the term "power management integrated circuit" ("PMIC") is used to describe any integrated circuit, or portion thereof, comprising circuitry configured for driving a battery charging function.

Referring to FIG. 1, this figure is a functional block diagram of an exemplary, non-limiting aspect of a PCD 100 in the form of a wireless telephone for implementing methods and systems for monitoring thermal conditions and managing thermal policies. As shown, the PCD 100 includes an on-chip system 102 that includes a multi-core central processing unit ("CPU") 110 and an analog signal processor 126 that are coupled together. The CPU 110 may comprise a zeroth core 222, a first core 224, and an Nth core 230 as understood by one of ordinary skill in the art. Instead of a CPU 110, a digital signal processor ("DSP") may also be employed as understood by one of ordinary skill in the art.

The CPU 110 may also be coupled to one or more internal, on-chip thermal sensors 157A as well as one or more external, off-chip thermal sensors 157B. The on-chip thermal sensors 157A may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157B may comprise one or more thermistors. The thermal sensors 157 may produce a voltage drop or a current that is converted to digital signals with an analog-to-digital converter ("ADC") controller 103 (See FIG. 2). However, other types of thermal sensors 157 may be employed as recognized by one of ordinary skill in the art.

The thermal sensors 157, in addition to being controlled and monitored by an ADC controller 103, may also be controlled and monitored by one or more thermal policy manager module(s) 101. The thermal policy manager module(s) 101 may comprise software which is executed by the CPU 110. However, the thermal policy manager module(s) 101 may also be formed from hardware and/or firmware as understood by one of ordinary skill in the art.

The thermal policy manager module(s) 101 may be coupled to a power management integrated circuit ("PMIC") 107. The PMIC 107 may be responsible for various functions including, but not limited to, distributing power to the various hardware components present on the chip 102 and controlling power source, i.e. battery, charging functions. The thermal policy manager module 101, although residing on the chip 102 in some embodiments, may be operable to monitor and control aspects of the PMIC 107 including, but not limited to, the rate of battery charging, the duration of battery charging, the priority of battery charging, the voltage and/or amperage allocated to battery charging, etc.

Additionally, the thermal policy manager module(s) 101 may be responsible for monitoring and controlling current flow from the PMIC 107 to the chip 102 devices as well as from a power source to the PMIC 107. Further, regardless of the specific aspects or functionality of the various devices comprised within a PCD 100 that may be monitored and controlled in any given embodiment by the thermal manager module(s) 101, the central purpose of the thermal manager module(s) 101 is to apply thermal policies that include one or more thermal mitigation techniques. Such thermal mitigation techniques may help the PCD 100 to maintain its highest level of functionality for a given use case by managing thermal conditions and/or thermal loads that, if unchecked, may give rise to detrimental thermal energy generation.

FIG. 1 also shows that the PCD 100 may include a monitor module 114. The monitor module 114 may communicate with multiple operational sensors (e.g., thermal sensors 157) distributed throughout the on-chip system 102 and/or PMIC 107, the CPU 110 of the PCD 100 and the thermal policy manager module 101. Specifically, the monitor module 114 may provide one or more indicators of events, processes, applications, resource status conditions, elapsed time, temperature, etc. in response to control signals originating from the thermal policy manager module 101. The thermal policy manager module 101 may work with the monitor module 114 to identify adverse thermal conditions and apply thermal policies that include one or more thermal mitigation techniques, as will be described in further detail below.

In a particular aspect, one or more of the method steps described herein may be implemented by executable instructions and parameters, stored in the memory 112, that form the one or more thermal policy manager module(s) 101. These instructions that form the thermal policy manager module(s) may be executed by the CPU 110, the analog signal processor 126, or any other processor, including a processor comprised within the PMIC 107, in addition to the ADC controller 103 to perform the methods described herein. Further, the processors, 110, 126, the memory 112, the instructions stored therein, or a combination thereof may serve as a means for performing one or more of the method steps described herein.

As illustrated in FIG. 1, a display controller 128 and a touchscreen controller 130 are coupled to the digital signal processor 110. A touchscreen display 132 external to the on-chip system 102 is coupled to the display controller 128 and the touchscreen controller 130.

FIG. 1 is a schematic diagram illustrating an embodiment of a portable computing device (PCD) that includes a video decoder 134. The video decoder 134 is coupled to the multicore central processing unit ("CPU") 110. A video amplifier 136 is coupled to the video decoder 134 and the touchscreen display 132. A video port 138 is coupled to the video amplifier 136. As depicted in FIG. 1, a universal serial bus ("USB") controller 140 is coupled to the CPU 110. Also, a USB port 142 is coupled to the USB controller 140. A memory 112 and a subscriber identity module (SIM) card 146 may also be coupled to the CPU 110. Further, as shown in FIG. 1, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 1, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 1 shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 1 further indicates that a radio frequency ("RF") transceiver 168 may be coupled to the analog signal processor 126. An RF switch 170 may be coupled to the RF transceiver 168 and an RF antenna 172. As shown in FIG. 1, a keypad 174 may be coupled to the analog signal processor 126. Also, a mono headset with a microphone 176 may be coupled to the analog signal processor 126. Further, a vibrator device 178 may be coupled to the analog signal processor 126. FIG. 1 also shows that a power supply 180, for example a battery, is coupled to the on-chip system 102. In a particular aspect, the power supply includes a rechargeable DC battery or a DC power supply that is derived from an alternating current ("AC") to DC transformer that is connected to an AC power source.

As depicted in FIG. 1, the touchscreen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, thermal sensors 157B, and the power supply 180 are external to the on-chip system 102. The monitor module 114 may receive one or more indications or signals from one or more of these external devices by way of the analog signal processor 126 and the CPU 110 to aid in the real time management of the resources operable on the PCD 100.

Figure 2:
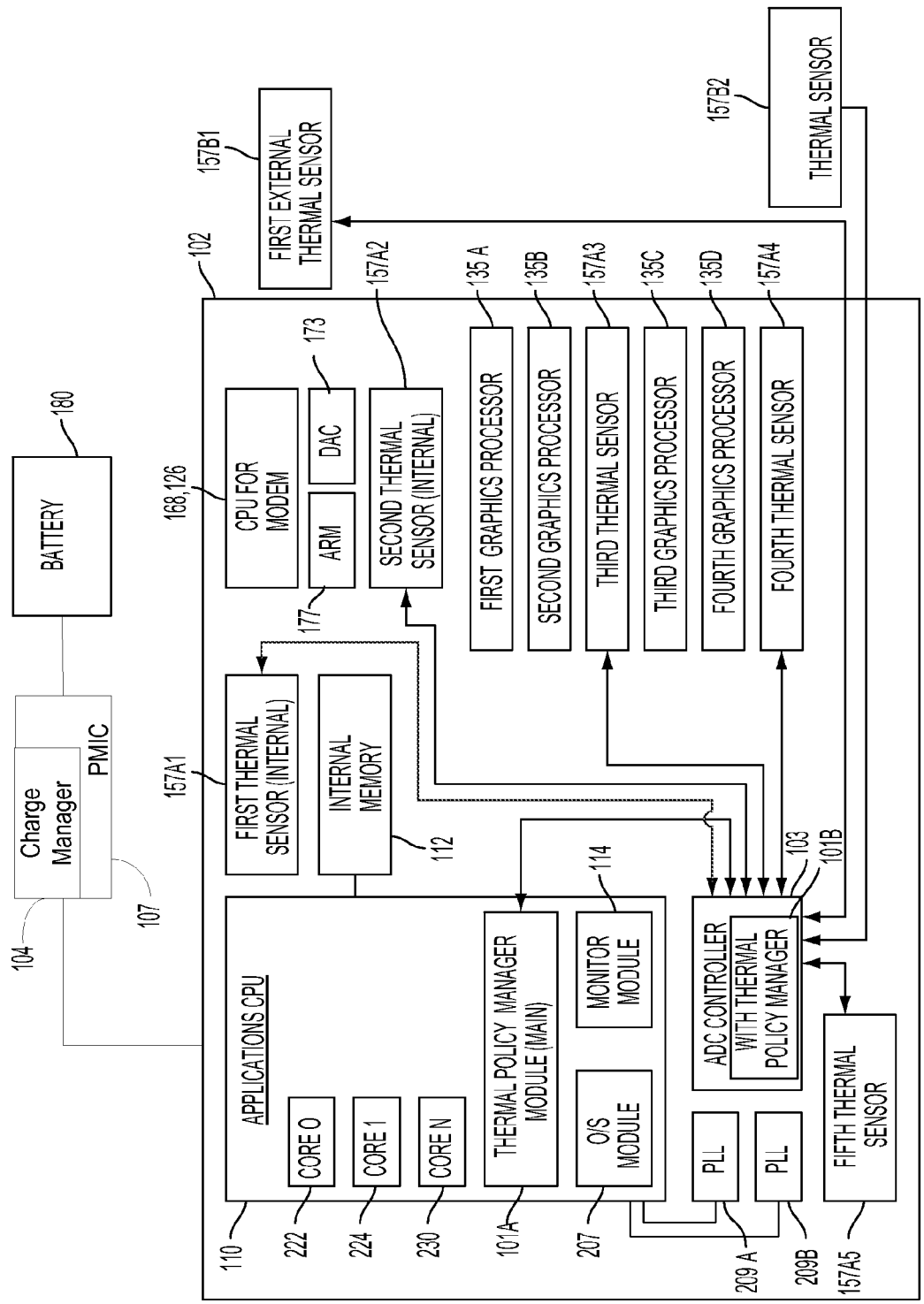
FIG. 2 is a functional block diagram illustrating an exemplary spatial arrangement of hardware for a chip illustrated in FIG. 1.

FIG. 2 is a functional block diagram illustrating an exemplary spatial arrangement of hardware for the chip 102 illustrated in FIG. 1. According to this exemplary embodiment, the applications CPU 110 is positioned on the far left side region of the chip 102 while the modem CPU 168/126 is positioned on a far right side region of the chip 102. The applications CPU 110 may comprise a multicore processor that includes a zeroth core 222, a first core 224, and an Nth core 230.

The applications CPU 110 may be executing a thermal policy manager module 101A (when embodied in software) or it may include a thermal policy manager module 101B (when embodied in hardware and/or firmware). The applications CPU 110 is further illustrated to include operating system ("O/S") module 207 and a monitor module 114.

The applications CPU 110 may be coupled to one or more phase locked loops ("PLLs") 209A, 209B which are positioned adjacent to the applications CPU 110 and in the left side region of the chip 102. Adjacent to the PLLs 209A, 209B and below the applications CPU 110 may comprise an analog-to-digital ("ADC") controller 103 that may include its own thermal policy manager module 101B that works in conjunction with the main thermal policy manager module 101A of the applications CPU 110.

The thermal policy manager module 101B of the ADC controller 103 may be responsible for monitoring and tracking multiple thermal sensors 157 that may be provided "on-chip" 102 and "off-chip" 102. The on-chip or internal thermal sensors 157A may be positioned at various locations to monitor the thermal conditions of the PCD 100.

For example, a first internal thermal sensor 157A1 may be positioned in a top center region of the chip 102 between the applications CPU 110 and the modem CPU 168/126 and adjacent to internal memory 112. A second internal thermal sensor 157A2 may be positioned below the modem CPU 168/126 on a right side region of the chip 102. This second internal thermal sensor 157A2 may also be positioned between a an advanced reduced instruction set computer ("RISC") instruction set machine ("ARM") 177 and a first graphics processor 135A. A digital-to-analog controller ("DAC") 173 may be positioned between the second internal thermal sensor 157A2 and the modem CPU 168/126.

A third internal thermal sensor 157A3 may be positioned between a second graphics processor 135B and a third graphics processor 135C in a far right region of the chip 102. A fourth internal thermal sensor 157A4 may be positioned in a far right region of the chip 102 and beneath a fourth graphics processor 135D. And a fifth internal thermal sensor 157A5 may be positioned in a far left region of the chip 102 and adjacent to the PLLs 209 and ADC controller 103.

One or more external thermal sensors 157B may also be coupled to the ADC controller 103. The first external thermal sensor 157B1 may be positioned off-chip and adjacent to a top right quadrant of the chip 102 that may include the modem CPU 168/126, the ARM 177, and DAC 173. A second external thermal sensor 157B2 may be positioned off-chip and adjacent to a lower right quadrant of the chip 102 that may include the third and fourth graphics processors 135C, 135D.

One of ordinary skill in the art will recognize that various other spatial arrangements of the hardware illustrated in FIG. 2 (or other hardware resources) may be provided as understood by one of ordinary skill in the art. FIG. 2 illustrates yet one exemplary spatial arrangement and how the main thermal policy manager module 101A and ADC controller 103 with its thermal policy manager module 101B may manage thermal states that are a function of the exemplary spatial arrangement illustrated in FIG. 2.

Thermal sensors 157 may be positioned adjacent to hardware, such as the CPU 110, and on a same surface with the hardware within the portable computing device 100. For example, see the first internal thermal sensor 157A1. The thermal policy manager module 101A may assign one or more specific thermal mitigation techniques unique to the hardware associated with a particular thermal sensor 157, such as the CPU 110 corresponding to the first internal thermal sensor 157A1. In one exemplary embodiment, the thermal mitigation techniques assigned to the CPU 110 and its corresponding thermal sensor 157A1 may be different compared to the thermal mitigation techniques assigned to the third graphical processor 135C associated with the third thermal sensor 157A3. In other exemplary embodiments, the thermal mitigation techniques applied to hardware may be uniform or the same across the whole portable computing device 100.

Figure 3:
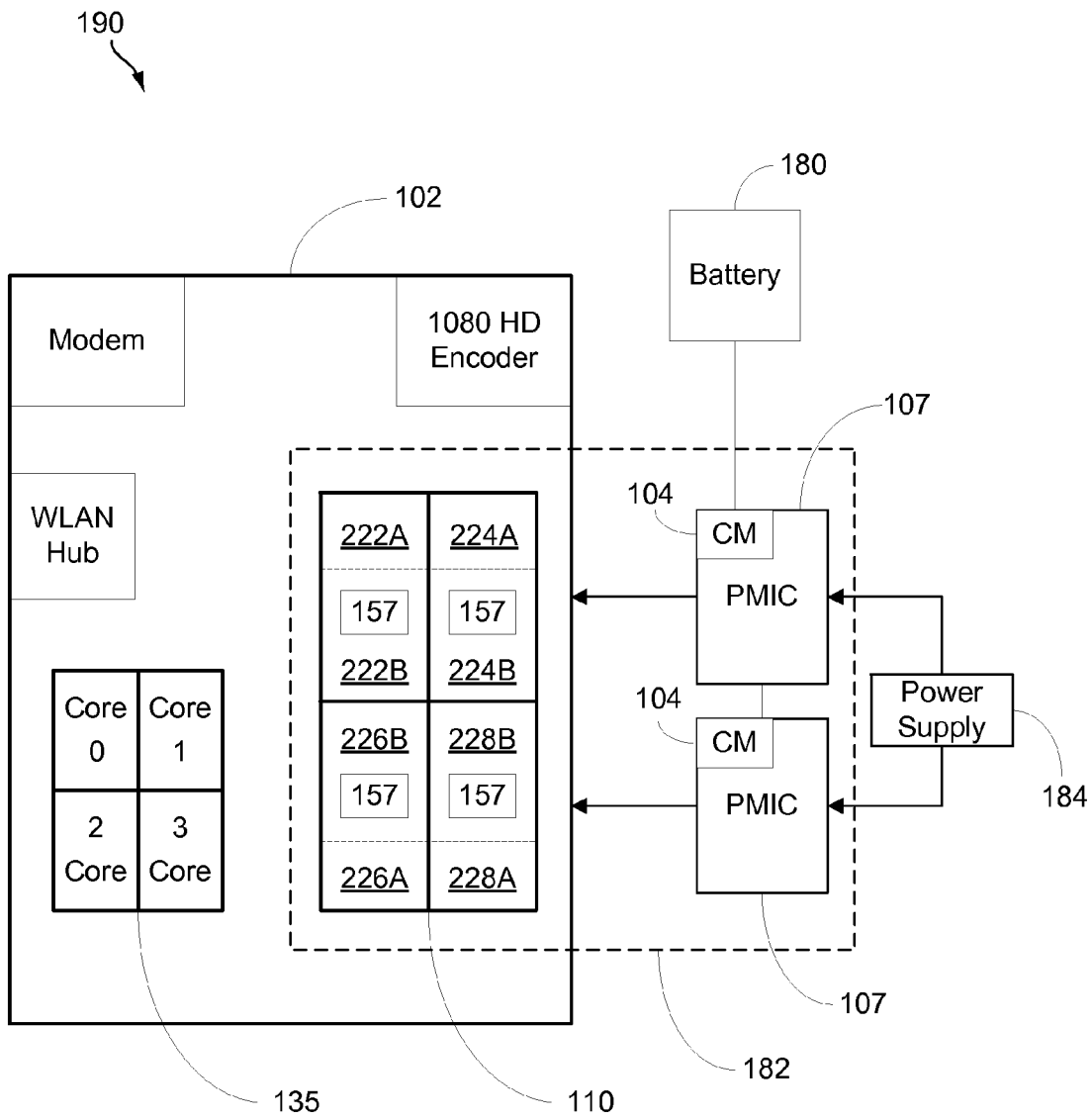
FIG. 3 is a functional block diagram illustrating an exemplary spatial arrangement of hardware for the chip illustrated in FIG. 1 and exemplary components external to the chip illustrated in FIG. 1.

FIG. 3 is a functional block diagram illustrating an exemplary spatial arrangement of hardware for the chip illustrated in FIG. 1 and exemplary components external to the chip illustrated in FIG. 1, including PMICs 107, battery 180 and power supply 184. More specifically, the FIG. 3 diagram illustrates an exemplary floor plan 190 of an application specific integrated circuit ("ASIC") 102 that may benefit from the application of various thermal mitigation techniques to the PMICs 107, such as those described above and below. In the FIG. 3 illustration, GPU bank 135 and CPU bank 110 represent the primary components generating thermal energy on ASIC 102. The PMICs 107 do not reside on ASIC 102, but are represented as being in near proximity 182 to CPU bank 110.

Notably, one of ordinary skill in the art will recognize that the depiction of PMICs 107 being in close physical proximity to CPU bank 110 is one exemplary embodiment for the electronic packaging of a PCD 100. As such, the thermal mitigation techniques described in this disclosure are not limited to a PCD 100 having a spatial arrangement corresponding to the FIG. 3 illustration. For example, due to limited physical space within PCDs 100, PMICs 107 may reside immediately behind and adjacent to an ASIC 102 such that thermal energy originating from the PMIC 107 may radiate through CPU bank 110 in one exemplary embodiment. In other exemplary embodiments with different spatial arrangements, the thermal energy from the PMIC 107 may radiate through GPU bank 135. As such, one of ordinary skill in the art will recognize that thermal energy radiating from a PMIC 107 may adversely affect temperature readings taken from sensors 157 on any of cores 222, 224, 226, 228 within CPU 110, GPU 135 or any other component within physical proximity of PMIC 107.

Therefore, thermal mitigation techniques directed to components within a PCD 100 that are not contained within the exemplary ASIC 102 such as, for example, PMICs 107, may benefit the processing performance of thermally sensitive components that are within the ASIC 102. For example, in the exemplary PCD 100 floor plan illustrated in FIG. 3, the thermal energy generating PMICs 107 are physically proximate 182 to the thermal energy generating, and thermally sensitive, CPU bank 110. Because the processing efficiency of CPU bank 110 degrades with increased exposure to thermal energy, the quality of service ("QoS"), i.e. user experience, associated with efficient processing performance of CPU bank 110 may be kept at the highest level possible under a given workload if CPU bank 110 does not suffer from exposure to thermal energy dissipated from the physically adjacent PMICs 107. Specific examples of thermal mitigation techniques that may be applied to PCD 100 components residing external to ASIC 102 are explained in more detail relative to FIGS. 5-11.

Figure 4:
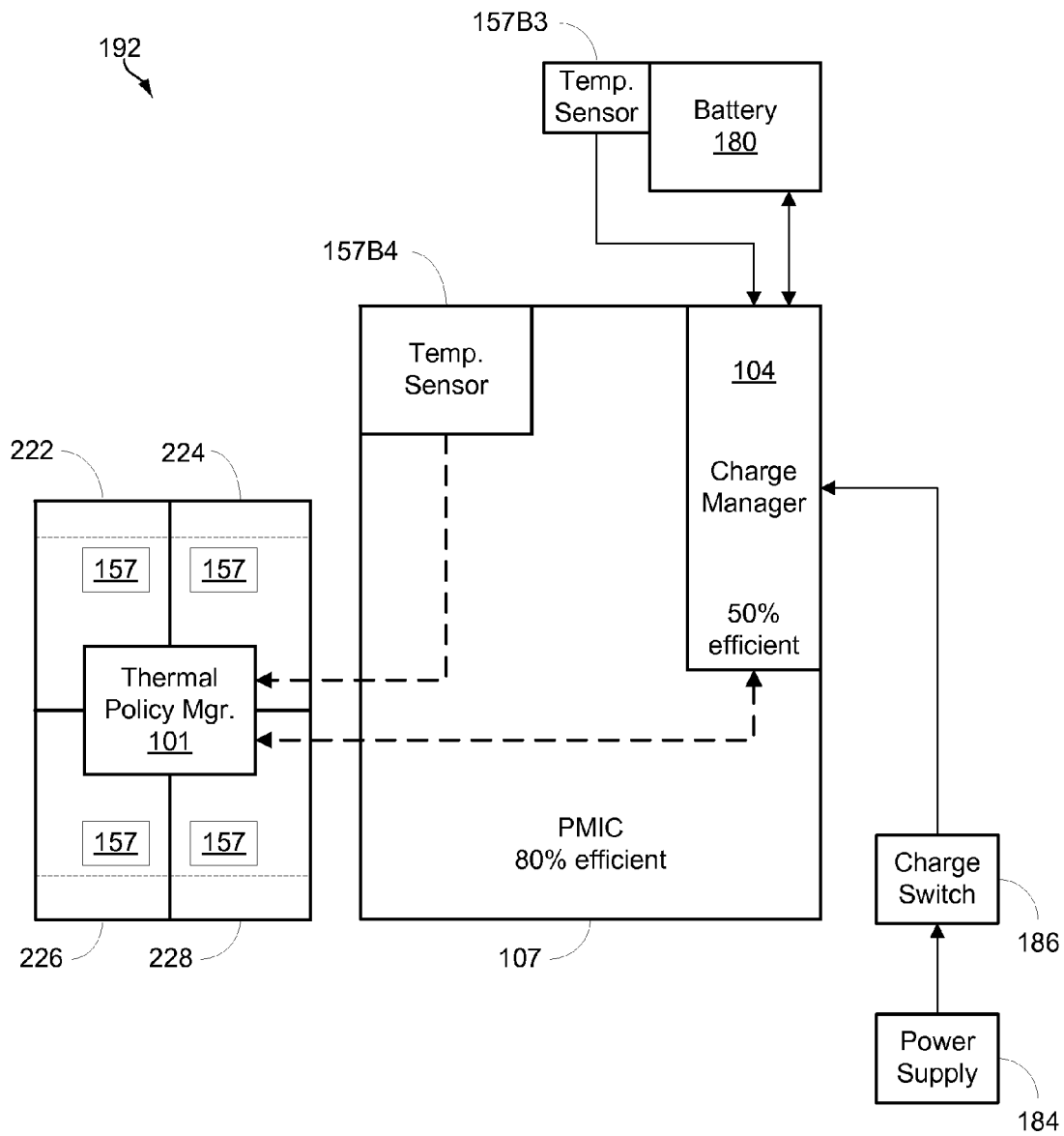
FIG. 4 is a functional block diagram illustrating respective logical connections between a power management integrated circuit ("PMIC"), a power source, a battery and hardware devices of the chip illustrated in FIG. 3.

FIG. 4 is a functional block diagram illustrating respective logical connections between a power management integrated circuit ("PMIC") 107, a power source 184, a battery 180 and hardware devices of the chip 102 illustrated in FIG. 3. This figure is not intended to provide any particular spatial arrangement of the components illustrated, as compared to FIG. 3. That is, for the purpose of illustration, PMIC 107 of FIG. 4 may be physically proximate to any thermally sensitive component of PCD 100 such as, for example, CPU bank 110 as depicted in FIG. 3. However, physically proximity of PMIC 107 is not limited to CPU 110. Moreover, the more detailed floor plan of PMIC 107 in FIG. 4 is offered for exemplary purposes only and is not intended to be a comprehensive, or limiting, depiction of a PMIC 107 layout.

FIG. 4 illustrates the main components of a system 192 for mitigating thermal issues within the PCD 100 by monitoring and controlling the PMIC 107 initiated charging functions for recharging battery 180. The system 192 may comprise the thermal policy manager module 101 residing virtually on any and all of cores 222, 224, 226 and 228 of CPU 110, a PMIC 107, and battery 180. CPU 110 generally corresponds to the CPU 110 residing on the chip system 102 of FIGS. 1-3.

The PMIC 107 may comprise a sensor 157B4 for detecting the operating temperature of PMIC 107 and transmitting signals indicative of such temperatures to thermal policy manager 101, or to other components internal or external to ASIC 102 in a given embodiment. The PMIC 107 may further comprise a charge manager 104 in communication with a charge switch 186 which is connected to a power source 184.

The charge manager 104 may be any combination of firmware and/or software running on the PMIC 107 and executable to control the charging operation for battery 180, such charge control algorithm basing its logic at least in part on the monitored voltage and/or temperature of battery 180. The charge manager 104 may further be operable to decide whether a charging current should be applied to battery 180 and whether the charging operation should be a "fast" charge or a "slow" charge.

One of ordinary skill in the art will recognize that PMIC 107 in general, and charge manager 104 in particular, represent thermal energy generating devices within an exemplary PCD 100. For illustrative purposes only, and not to imply any limitation in operating efficiency of a PMIC 107 or any other thermal energy generating component that may be the object of a thermal mitigation technique, PMIC 107 is represented in FIG. 4 as a component which dissipates, in the form of thermal energy, 20% of the power it regulates. Similarly, for illustrative purposes, charge manager 104 is represented as dissipating upwards of 50% of the power it consumes to perform its various functions. Notably, due to the proximity 182 of PMIC 107 to CPU 110 (as seen in FIG. 3), the thermal energy dissipated by PMIC 107 and charge manager 104 may jeopardize the integrity of CPU 110 or otherwise require the application of thermal mitigation techniques to CPU 110 that may degrade the QoS of PCD 100. As such, thermal mitigation techniques applied to PMIC 107 or, more specifically, to the charging functionality of charge manager 104, may mitigate the thermal energy dissipation associated with PMIC 107 and charge manager 104, thus advantageously reducing the negative thermal impact on CPU 110.

The charge manager 104 may be in communication with the thermal policy manager module 101. The thermal policy manager module 101 may monitor and ultimately control the charging operation of battery 180 as implemented by charge manager 104. One control feature of the thermal policy manager 101 may include a thermal mitigation technique as described below, although it is not limited to the exemplary techniques disclosed in the present specification. The thermal policy manager module 101 may monitor the various temperature readings of sensors 157. The thermal policy manager 157 may determine that ongoing charging operations implemented by the PMIC 107 through the charge manager 104 are a source of thermal energy that is, or that may become, detrimental to CPU 110. The thermal policy manager module 101 may issue commands to the charge manager 104 in order to override and control the default charging algorithm being executed by charge manager 104 for charging battery 180. Such control by the thermal policy manager module 101 may occur when a thermal mitigation technique is activated by the thermal policy manager module 101.

One thermal mitigation technique activated by the thermal policy manager 101 may include the reduction of electrical current being applied through the charge switch 186 to the battery 180. This electrical current reduction may be activated in response to commands issued by the thermal policy manager module 101 in response to the temperature increase detected by the various temperature sensors 157. Notably, the reduction in electrical current to a charging battery 180 may prolong the charging operation, however, such mitigation technique may advantageously reduce the amount of thermal energy being dissipated from PMIC 107 and supporting circuitry, thus possibly avoiding unwanted loss in processing efficiency at CPU 110. Other thermal mitigation techniques will be described in more detail relative to FIGS. 6-7.

Figure 5:
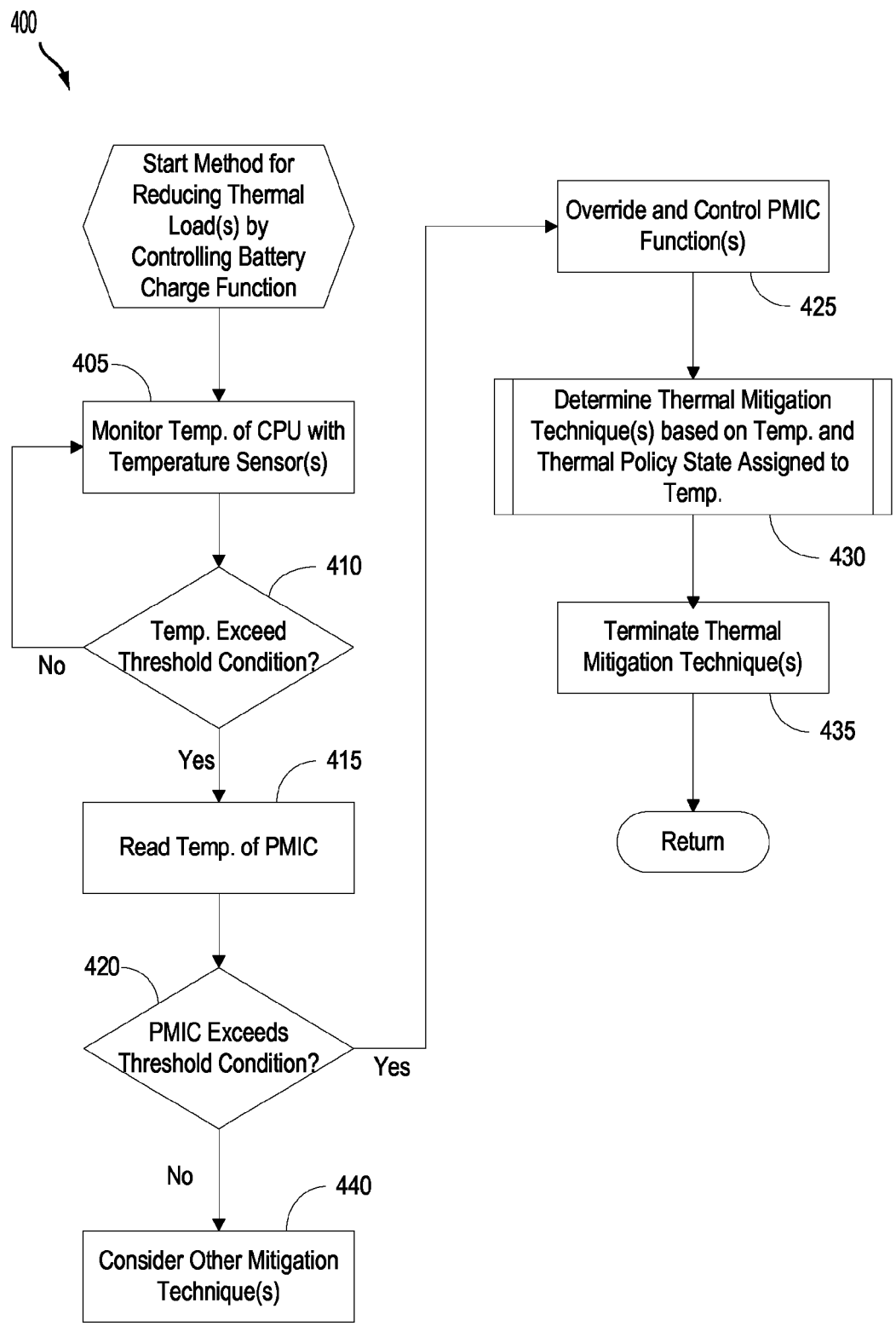
FIG. 5 is a logical flowchart illustrating a method for reducing thermal loads by controlling the battery charging operation in a PCD.

FIG. 5 is a logical flowchart illustrating a method 400 for reducing thermal loads by controlling the battery 180 charging operation in a PCD 100. At block 405, the thermal policy manager module 101 may monitor the temperature of the PCD 100 with temperature sensors 157. Particularly, the thermal policy manager module 101 may monitor the temperature near the hardware devices on chip 102 of FIGS. 1-3, such as, for example, CPU 110.

Next, in decision block 410, the thermal policy manager module 101 may track threshold temperature values that are assigned to one or more thermal policy states described in further detail in connection with FIGS. 6-7 listed below. If the inquiry to decision block 410 is negative, then the "NO" branch is followed back to block 405. If the inquiry to decision block 410 is positive, then the "YES" branch is followed to block 415. In block 415, the thermal policy manager module 101 may read the temperature of PMIC 107 via signals generated by temperature sensor(s) 157B4.

In decision block 420, the thermal policy manager module 101 may determine that the PMIC 107 represents a thermal energy source exterior to chip 102 that may be mitigated in lieu of applying thermal mitigation techniques directly to thermally impacted devices on chip 102, such as CPU 110. That is, if the sensor 157B4 of the PMIC 107 indicates that the temperature of the PMIC 107 exceeds a threshold, thus indicating that the PMIC 107 represents an external thermal energy source that may be generating thermal energy detrimental to chip 102 devices, the thermal policy manager module 101 may proceed to block 425. If, at decision block 420, it is determined that PMIC 107 does not represent a significant source of thermal energy, thus dictating that thermal mitigation techniques applied to the PMIC 107 are not warranted, the thermal policy manager module 101 may proceed to block 440 and consider alternative thermal mitigation techniques or mechanisms unrelated to PMIC 107 and/or charge manager 104.

Next, in block 425, the thermal policy manager module 101 may elect to override and control PMIC 107 functionality, such as an ongoing battery charging routine implemented by charging manager 104. Subsequently, in routine or sub-method block 430, the thermal policy manager module 101 may determine which thermal mitigation technique for the PMIC 107 should be activated based on the current temperature(s) that are measured at the chip 102 and PMIC 107 and based on the thermal policy assigned to such temperatures. Further details of sub-method block 430 will be described below in connection with FIG. 10. Multiple thermal policies directed toward the control of charge manager 104 will be described in further detail below in connection with FIGS. 6-7.

One exemplary thermal mitigation technique includes the thermal policy manager module 101 overriding the default charging algorithm of charge manager 104 and dictating that the electrical charge current provided to battery 180 be reduced. Reduction of the current supplied to battery 180 may slow the charge cycle, however, such current reduction may also reduce the thermal energy generation on PMIC 107, thus negating the need to apply thermal mitigation techniques directly to thermally sensitive devices proximate to PMIC 107. Other thermal mitigation techniques which are dependent on policy states are described below in connection with FIGS. 6-7.

After routine block 430, in block 435, the thermal policy manager module 101 may terminate any active thermal mitigation technique(s) for the PMIC 107. More specifically, upon detecting a reduced temperature at a sensor 157, thermal policy manager 101 may relinquish control of the battery charging function and direct charge manager 104 to resume normal charging operations. The method 400 then returns back to block 405 in which the temperature of the CPU 110 is monitored by the thermal policy manager module 101.

Figure 6:
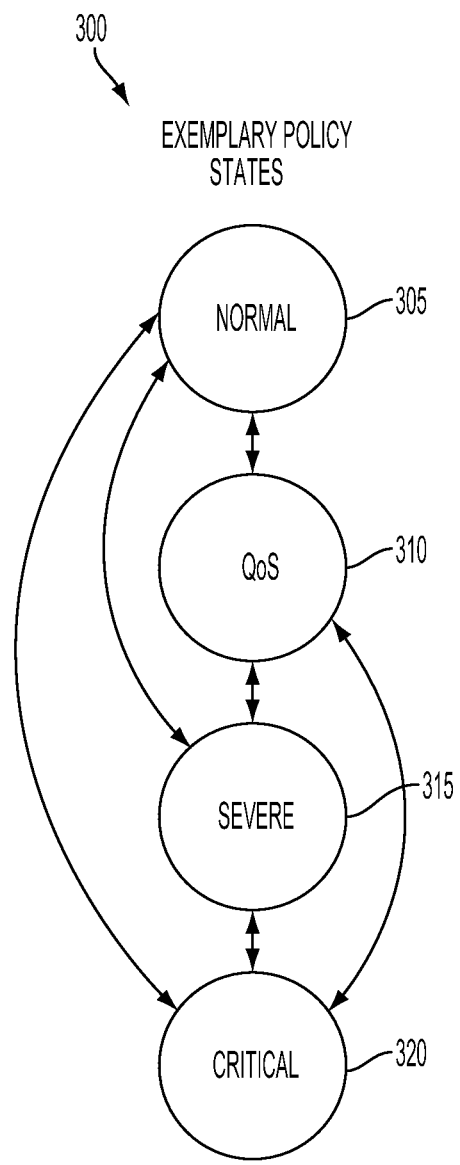
FIG. 6 is an exemplary state diagram that illustrates various thermal policy states that are tracked by the thermal policy manager in the PCD of FIG. 1.

FIG. 6 is an exemplary state diagram 300 that illustrates various thermal policy states 305, 310, 315, and 320 that are tracked by the thermal policy manager module 101. While only four states are illustrated, one of ordinary skill in the art will recognize that other states beyond these four may be created. Similarly, one of ordinary skill in the art recognizes that fewer policies may be employed without departing from the invention. Further, additional sub-states or sub-policies may be added to each state 305, 310, 315, and 320 as understood by one of ordinary skill in the art.

The first policy state 305 may comprise a "normal" thermal state in which the thermal policy manager module 101 only monitors thermal sensors 157 in a routine or ordinary fashion. In this exemplary first and normal state 305, the PCD 100 is usually not in any danger or risk of experiencing an adverse thermal condition, such as, reaching critical temperatures that may cause failure of any of the hardware and/or software components such as, for example, CPU 110. In this exemplary state, the thermal sensors 157 may be detecting or tracking temperatures that are at 50° C. or below. However, one of ordinary skill in the art will recognize that other temperature ranges may be established for the first and normal state 305 as understood by one of ordinary skill in the art.

The second policy state 310 may comprise a "quality of service" or "QoS" state in which the thermal policy manager module 101 may increase the frequency in which thermal sensors 157 are polled or in which the thermal sensors 157 send their temperature status reports to the thermal policy manager module 101. Increasing the frequency in which thermal sensors 157 are polled, or in which the thermal sensors 157 send their temperature status reports, may help the thermal policy manager module 101 compensate for situations in which one or more thermal sensors 157 are not in direct contact with a region which is exhibiting high temperatures. The frequency in which temperature readings are received may be adjusted to compensate for thermal constants of different materials that may exist between a high thermal region and a particular thermal sensor 157.

The exemplary second state 310 may be reached or entered into by the thermal policy manager module 101 when a significant change of temperature has been detected in the first, normal state 305. The threshold or magnitude of the change in temperature (delta T) which triggers this QoS state 310 may be adjusted or tailored according to a particular PCD 100. Therefore, while a PCD 100 may be operating in the first normal state 305, depending upon the magnitude of the change in temperature that is detected by one or more thermal sensors, the PCD 100 may leave the first normal state 305 and enter into the second QoS state 310 as tracked by the thermal policy manager module 101.

For example, a PCD 100 may have a first maximum temperature reading from a given thermal sensor 157 of approximately 40° C. And a second reading from the same thermal sensor 157 may show a change in temperature of only 5° C. which takes the maximum temperature being detected to 45° C. However, while the maximum temperature being detected may be below an established threshold of 50° C. for the first, normal state 305, the change in temperature by 5° C. within a relatively short time frame may be significant enough for the thermal policy manager module 101 to change the state to the second, QoS state 310.

In the second, QoS thermal state 310 the thermal policy manager module 101 may request or it may actually perform one or more thermal mitigation techniques in order to reduce the thermal load and temperature of the PCD 100. In this particular second thermal state 310, the thermal policy manager module 101 is designed to implement or request thermal mitigation techniques that may be barely perceivable by an operator and which may degrade a quality of service provided by the PCD 100 in a minimal fashion. The temperature range for this second, QoS thermal state 310 may comprise a range between about 50° C. to about 80° C.

One of ordinary skill in the art will recognize that other temperature ranges may be established for the second, QoS state 305 and are understood by one of ordinary skill in the art. Further, one of ordinary skill in the art will recognize that other sub-states or sub-policies may be created and used relative to the current set described.

As noted previously, the second, QoS state 310 may be triggered based on the magnitude and/or location of the change in temperature and are not necessarily limited to the endpoints of a selected temperature range. Further details about this second, QoS thermal state 310 will be described below in connection with FIG. 7.

The third thermal state 315 may comprise a "severe" state in which the thermal policy manager module 101 continues to monitor and/or receives interrupts from thermal sensors 157 while requesting and/or applying more aggressive thermal mitigation techniques relative to the second, QoS state 310 described above. This means that in this state the thermal policy manager module 101 is less concerned about quality of service from the perspective of the operator.

In this third thermal state 315, the thermal policy manager module 101 is more concerned about mitigating or reducing thermal load in order to decrease an overall temperature of the PCD 100. The PCD 100 may have degradations in performance that are readily perceived or observed by an operator in this state 315. The third, severe thermal state 315 and its corresponding thermal mitigation techniques applied or triggered by the thermal policy manager module 101 will be described in further detail below in connection with FIG. 7. The temperature range for this third, severe thermal state 310 may comprise a range between about 80° C. to about 100° C.

Similar to the first thermal state 305 and second thermal state 310 as discussed above, this third and severe thermal state 315 may be initiated based upon the change in temperature detected by one or more thermal sensors 157 and not necessarily limited to a temperature range established or mapped for this third thermal state 315. For example, as the arrows in this diagram illustrate, each thermal state may be initiated in sequence or they can be initiated out of sequence depending upon the magnitude of the change in temperature (delta T) over a certain amount of time that may be detected. So this means that the PCD 100 may leave the first and normal thermal state 305 and enter into or initiate the third and severe thermal state 315 based on a change in temperature that is detected by one or more thermal sensors 157, and vice versa.

Similarly, the PCD 100 may be in the second or QoS thermal state 310 and enter into or initiate the fourth or critical state 320 based on a change in temperature over an amount of time that is detected by one or more thermal sensors 157, and vice versa. In this exemplary fourth and critical state 320, the thermal policy manager module 101 is applying or triggering as many and as sizable thermal mitigation techniques as possible in order to avoid reaching one or more critical temperatures that may cause permanent damage to the electronics contained within the PCD 100.

This fourth and critical thermal state 320 may be similar to conventional techniques that are designed to eliminate functionality and operation of a PCD 100 in order to avoid critical temperatures. The fourth thermal state 320 may comprise a "critical" state in which the thermal policy manager module 101 applies or triggers the shutting down of non-essential hardware and/or software, such as a charging function for battery 180. The temperature range for this fourth thermal state may include those of about 100° C. and above. The fourth and critical thermal state 320 will be described in further detail below in connection with FIG. 7.

The thermal policy management system is not limited to the four thermal states 305, 310, 315, and 320 illustrated in FIG. 6. Depending upon a particular PCD 100, additional or fewer thermal states may be provided as understood by one of ordinary skill in the art. That is, one of ordinary skill in the art recognizes that additional thermal states may improve functionality and operation of a particular PCD 100 while, in other situations, fewer thermal states may be preferred for a particular PCD 100 that has its own unique hardware and/or software.

FIG. 7 is a diagram illustrating exemplary thermal mitigation techniques 800 that may be applied or ordered by the thermal policy manager module 101 and are dependent upon a particular thermal state of a PCD 100. As noted previously, the first thermal state 305 may comprise a "normal" state in which the thermal policy manager module 101 being executed by the CPU 110 and partially by the ADC controller 103 may monitor, poll, or receive one or more status reports on temperature from one or more thermal sensors 157 as illustrated in FIG. 2. In this first thermal state 305, a PCD 100 may not be in any danger or risk of reaching a critical temperature that may harm one or more software and/or hardware components within the PCD 100.

Usually, in this first thermal state 305, the thermal policy manager module 101 is not applying or has not requested any initiation of thermal mitigation techniques such that the PCD 100 is operating at its fullest potential and highest performance without regard to thermal loading. The temperature range for this first thermal state 305 may include those of 50° C. and below. For this first thermal state 305, the thermal policy manager module 101 may reside in the ADC controller 103 while the main thermal policy manager module 101 for all other states may reside or be executed by the CPU 110. In an alternate exemplary embodiment, the thermal policy manager module 101 may reside only in the CPU 110.

In the second thermal state 310 also referred to as the QoS state 310, once it is initiated, the thermal policy manager module 101 may begin more rapid monitoring, polling, and/or receiving of interrupts (relative to the first thermal state 305) from thermal sensors 157 regarding current temperature of the PCD 100. In this exemplary second thermal state 310, the thermal policy manager module 101 may initiate or request the monitor module 114 and/or operating system ("O/S") module 207 of FIG. 2 to start applying thermal mitigation techniques but with the objective to maintain high-performance with little or no degradations to the quality of service as perceived by the operator of the PCD 100.

According to this exemplary second thermal state 310 illustrated in FIG. 7, the thermal policy manager module 101 may request the monitor 114 and/or the O/S module 207 to initiate thermal mitigation techniques such as, but not limited to, thermal mitigation techniques directed directly at affected components residing within chip 102 or thermal mitigation techniques directed at thermal energy generating components external, yet proximate, to chip 102. Thermal mitigation techniques directed at thermal energy generating components external, yet proximate, to chip 102 may include, but is not limited to, override and control of a battery charge function executed on PMIC 107.

The temperature range for this second thermal state may include those of about 50° C. to about 80° C. However, other temperature ranges for this second thermal state may be determined and used for a particular PCD 100 having a unique thermal imprint.

Referring now to the third thermal state 315 of FIG. 7, also known as the severe thermal state 315, the thermal policy manager module 101 may start continuous monitoring, polling, or receiving interrupts from thermal sensors 157 so that temperature is sensed more continuously/frequently compared to the second lower thermal state 310. In this exemplary thermal state 315, the thermal policy manager module 101 may apply, or request that the monitor module 114 and/or O/S module 207 apply, more aggressive thermal mitigation techniques and/or additional thermal mitigation techniques (relative to the second thermal state 310) with probable perceivable degradation of performance observed by an operator of the PCD 100.

According to this exemplary third thermal state 315, the thermal policy manager module 101 may cause reduction in power to one or more hardware devices that may or may not be external to chip 102 like amplifiers, processors, advanced receiver hardware, etc. For example, one thermal mitigation technique at this third thermal state 315 may include limiting a duration in which a particular hardware device may consume or use electrical current. Such a thermal mitigation technique is described below in connection with FIG. 10.

The thermal mitigation techniques of this third and severe thermal state 315 may be the same as those described above with respect to the second, quality of service thermal state 310. However, these same thermal mitigation techniques may be applied in a more aggressive manner. For example, when overriding and controlling battery charge functions, the thermal policy manager module 101 may request that the charge current is reduced more significantly or cycled on and off in a more favorable duty cycle, as compared to the control algorithm applied in the second thermal state 310. These lower charge currents and/or charge cycle durations may be lower than is recommended for maintaining a battery charge or for staying ahead of a power consumption rate associated with a particular application program running on CPU 110, GPU 135, etc.

Referring now to the fourth and critical state 320 of FIG. 7, the thermal policy manager module 101 may start shutting down, or requesting the monitor 114 and/or O/S module 207 to start shutting down, all nonessential hardware and/or software modules. "Nonessential" hardware and/or software modules may be different for each type of particular PCD 100. According to one exemplary embodiment, all nonessential hardware and/or software modules may include all of those outside of an emergency 911 telephone call function and global positioning satellite ("GPS") functions.

This means that the thermal policy manager module 101 in this fourth, critical thermal state 320 may cause the shutdown of hardware and/or software modules that are outside of emergency 911 telephone calls and GPS functions. The thermal policy manager module 101 may shut down modules in sequence and/or in parallel depending upon the critical temperatures being monitored by the thermal sensors 157, locations of the thermal sensors 157, and the change in temperature being observed by the thermal policy manager module 101. The temperature range for this fourth thermal state 320 may include those of about 100° C. and above.

Figure 8:
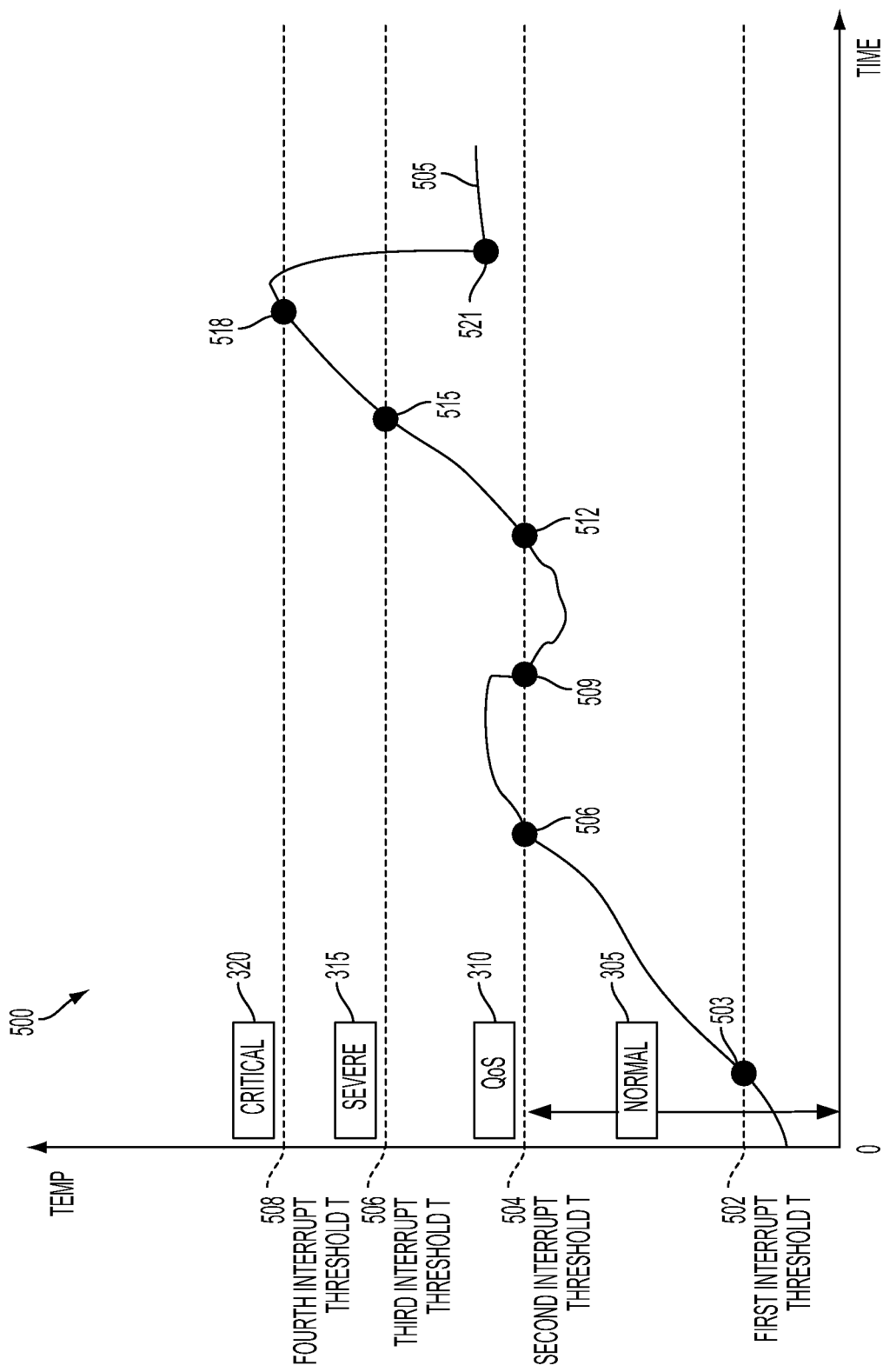
FIG. 8 is a diagram illustrating an exemplary graph of temperature versus time and corresponding thermal policy states.

FIG. 8 is a diagram illustrating an exemplary graph 500 of temperature versus time and corresponding thermal policy states 305, 310, 315, and 320. At the first point 503 of the temperature plot or line 505, the thermal policy manager module 101 may receive a first interrupt temperature reading of 40° C. from one or more thermal sensors 157. Since this first temperature reading of 40° C. may be below the maximum temperature of 50° C. set for the normal thermal state 305, then the thermal policy manager module 101 may remain in the first or normal thermal state 305.

At a second point 506 along the temperature line 505, the thermal policy manager module 101 may receive a second interrupt temperature reading of 50° C. While 50° C. may be within the selected temperature range for the first thermal state 305, if the change in temperature from the last temperature reading was significant, such as a large temperature change within a short period of time (like a 3° C. change within five seconds), then such a change or jump in temperature may trigger the thermal policy manager module 101 to leave the normal thermal state 305 and initiate the second, QoS thermal state 310.

Between the second point 506 and third point 509 of the temperature line 505, the temperature of the PCD 100 was above 50° C. and the thermal policy manager module 101 may have requested or activated one or more thermal mitigation techniques in order to lower the temperature of the PCD 100. At the third point 509 of the temperature line 505, the thermal policy manager module 101 may change the thermal state of the PCD 100 from the second state 310 to the first and normal state 305.

At the fourth point 512, the thermal policy manager module 101 may observe that the temperature trend is moving in an upward fashion or, in other words, the temperature line 505 may have a positive slope or change in delta T. The thermal policy manager module 101 may change the thermal state of the PCD 100 in view of this data from the first thermal state 305 to the second, QoS thermal state 310. In the second thermal state 310, the thermal policy manager module 101 may request or it may activate one or more thermal mitigation techniques that should not significantly impact the quality of service provided by the PCD 100. The second thermal state 310 may include a temperature range between a temperature of about 50° C. to about 80° C.

Moving along the temperature line 505 to the fifth point 515 which has a magnitude of about 80° C., the thermal policy manager module 101 may initiate a change of thermal state from the second, QoS thermal state 310 to the third and severe thermal state 315. As noted previously, the temperature range for this first thermal state may include a range between about 80° C. to about 100° C. In this third and severe thermal state 310, the thermal policy manager module 101 may be requesting or activating a plurality of thermal mitigation techniques that may impact the quality of service and performance of the PCD 100.

The segment of the temperature line 505 between the fifth point 515 and sixth point 518 reflects that the third and severe thermal state 310 has been unsuccessful in mitigating the temperature rise within the PCD 100. Therefore, at the sixth point 518 which may have a magnitude of approximately 100° C., the thermal policy manager module 101 may enter into the fourth and critical state 320. In this fourth and critical state 320, the thermal policy manager module 101 may deactivate or request that certain hardware and/or software components be shut down in order to alleviate the current thermal load. As noted previously, the thermal policy manager module 101 may cause any hardware and/or software component outside of emergency 911 call functions and GPS functions to be shut down while in this fourth thermal state 320.

Moving along the temperature line 505 to the seventh point 521, the segment of the line 505 between the sixth point 518 and seventh point 521 reflects that the critical thermal state 320 and severe thermal state 315 were successful in lowering the temperature of the PCD 100. As noted previously, one or more thermal states may be jumped or skipped depending upon the temperature measured by the thermal sensors 157 and observed by the thermal policy manager module 101. Further, when returning to lower thermal states, the thermal states followed by the thermal policy manager module 101 may be similar to a hysteresis.

Figure 9A:
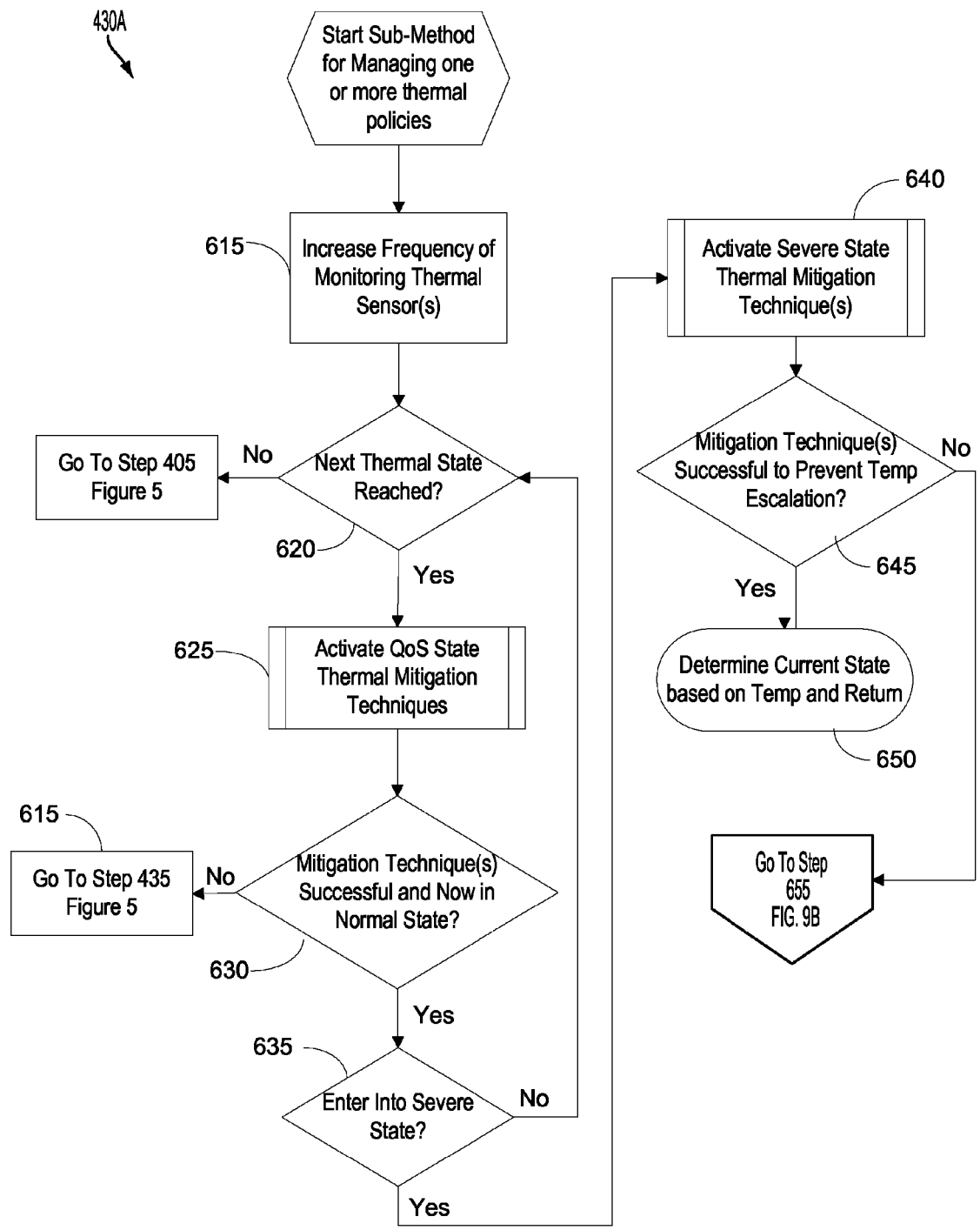
FIGS. 9A-9B are logical flowcharts illustrating a sub-method or subroutine for applying various thermal mitigation techniques.
Figure 9B:
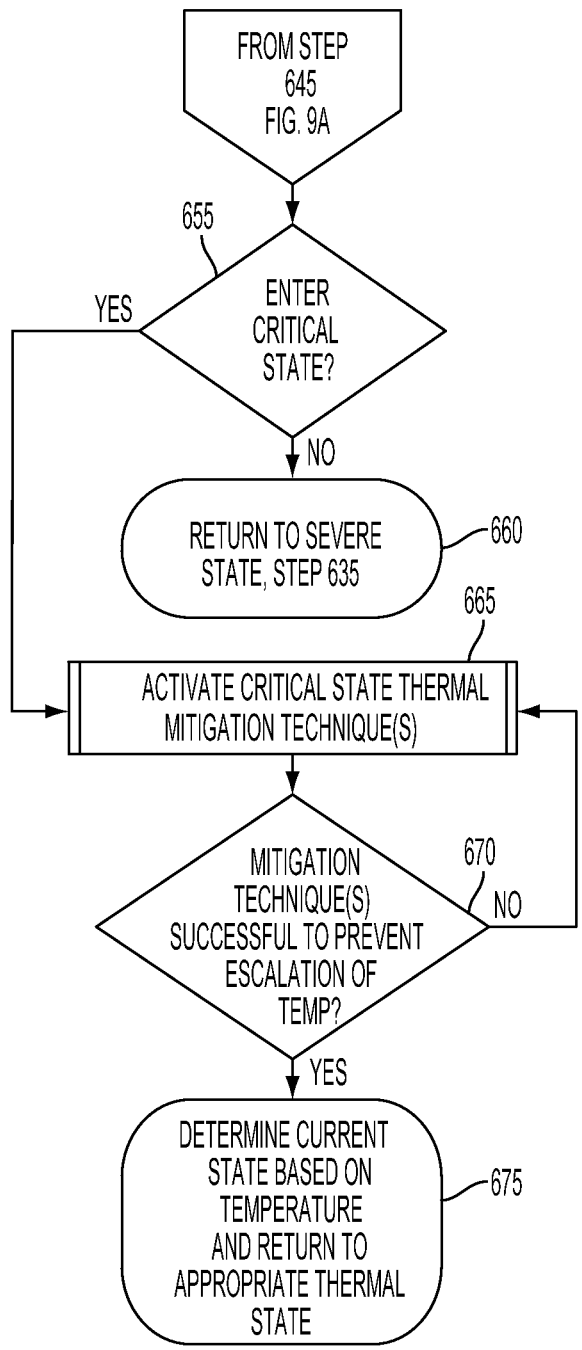

FIGS. 9A-9B are logical flowcharts illustrating a sub-method 430 for determining thermal mitigation technique(s) based on current temperature of a PCD 100 or, more specifically, of a device residing on exemplary chip 102 such as, but not limited to, CPU 110. It is noted that while sub-method or routine 430 is illustrated to occur after block 425 of FIG. 5, the main method 400 of FIG. 5 may continue to run or execute in parallel relative to sub-method 430 of FIGS. 9A-9B. That is, the electrical current readings described in method 400 of FIG. 5 may continue to be taken while this sub-method 430 is being executed.

Method 430A of FIG. 9A starts with first block 615 in which the thermal policy manager module 101 may increase the frequency of the monitoring of the thermal sensors 157. In block 615, the thermal policy manager module 101 may actively poll the thermal sensors 157 more frequently or it may request the thermal sensors 157 to send more frequent interrupts that provide temperature data. This increased monitoring of thermal sensors 157 may occur in the first or normal state 305 and it may also occur in the second or quality of service thermal state 310.

Alternatively, block 615 may be moved altogether to after block 620. In this way, the increase thermal monitoring of sensors 157 would occur only if the next thermal state, the QoS state, has been reached. As will be described below, the methods described in this disclosure are not limited to the specific sequence of each of the embodiments as understood by one of ordinary skill in the art.

Next, in decision block 620, the thermal policy manager module 101 may determine if the next thermal state has been reached or achieved by the PCD 100. In this decision block 620, the thermal policy manager module 101 may be determining if the temperature range assigned to the second thermal state 310 has been achieved. Alternatively, the thermal policy manager in this decision block 620 may be determining if a significant change in temperature (delta T) over time has occurred since a last reading.

If the inquiry to decision block 620 is negative, then the "NO" branch is followed back to block 405 of FIG. 5. If the inquiry to decision block 620 is positive, then the "YES" branch is followed to routine or submethod 625. Routine or submethod 625 may comprise a second thermal state 310 also referred to as the QoS state 310 in which thermal policy manager module 101 may apply or request one or more thermal mitigation techniques described above in connection with FIG. 7. For example, the thermal policy manager module 101 may request the monitor 114 and/or the O/S module 207 to initiate thermal mitigation techniques such as, but not limited to, thermal mitigation techniques directed directly at affected components residing within chip 102 or thermal mitigation techniques directed at thermal energy generating components external, yet proximate, to chip 102. Thermal mitigation techniques directed at thermal energy generating components external, yet proximate, to chip 102 may include, but is not limited to, override and control of a battery charge function executed on PMIC 107.

Subsequently, in decision block 630, the thermal policy manager module 101 may determine if the one or more thermal mitigation techniques of the second or QoS state 310 were successful and if the current temperature as detected by the one or more thermal sensors 157 falls within the next lower thermal range for the first or normal state 305. If the inquiry to decision block 630 is positive, then the "YES"

branch is followed back to block 435 of FIG. 5. If the inquiry to decision block 630 is negative, then the "NO" branch is followed to decision block 635.

In decision block 635, the thermal policy manager module 101 may determine if the PCD 100 has now entered into the third or severe thermal state 315 according to the temperature as detected by the one or more thermal sensors 157. Alternatively, the thermal policy manager module 101 may determine if the PCD 100 has entered into the third or severe thermal state 315 by determining if a significant change in temperature (delta T) has occurred.

If the inquiry to decision block 635 is negative, then the "NO" branch is followed back to block 620. If the inquiry to decision block 635 is positive, then the "YES" branch is followed to submethod or subroutine 640.

In submethod or subroutine 640, the thermal policy manager module 101 has determined that the PCD 100 has entered into the third or severe thermal state. The thermal policy manager module 101 may then activate or request that one or more thermal mitigation techniques be applied. As noted previously, the thermal policy manager module 101 in this third or severe thermal state 315 may start continuous monitoring, polling, or receiving interrupts from thermal sensors 157 so that temperature readings are sensed more continuously/frequently compared to the second lower thermal state 310.

In this exemplary third thermal state 315, the thermal policy manager module 101 may apply or request that the monitor module 114 and/or O/S module 207 apply more aggressive thermal mitigation techniques and/or additional thermal mitigation techniques (relative to the second thermal state 310) with probable perceivable degradation of performance observed by an operator of the PCD 100. According to this exemplary thermal state 315, the thermal policy manager module 101 may cause severe reduction in current supplied to battery 180 for charging or, in some embodiments, altogether abort charging.

The thermal mitigation techniques of this third and severe thermal state 315 may be the same as those described above with respect to the second, quality of service thermal state 310. However, these same thermal mitigation techniques may be applied in a more aggressive manner, as described above. For example, when overriding and controlling battery charge functions, the thermal policy manager module 101 may request that the charge current is reduced more significantly or cycled on and off in a more favorable duty cycle, as compared to the control algorithm applied in the second thermal state 310. These lower charge currents and/or charge cycle durations may be lower than is recommended for maintaining a battery charge or for staying ahead of a power consumption rate associated with a particular application program running on CPU 110, GPU 135, etc.

Next, in decision block 645, the thermal policy manager module 101 may determine if the one or more thermal mitigation techniques applied in submethod or routine 640 were successful to prevent escalation of temperature for the PCD 100. If the inquiry to decision block 645 is negative, then the "NO" branch is followed to step 655 of FIG. 9B. If the inquiry to decision block 645 is positive, then the "YES" branch is followed to step 650 in which the thermal policy manager module 101 determines the current thermal state of the PCD 100 based on temperature readings provided by the one or more thermal sensors 157. Depending the temperature reading in block 650, the sub-method 430 may proceed to either block 625 of FIG. 9A or block 435 of FIG. 5.

Referring now to FIG. 9B, this figure is a continuation flow chart relative to the flowchart illustrated in FIG. 9A. The method 430B of FIG. 9B starts with decision block 655 in which the thermal policy manager module 101 may determine if the PCD 100 has entered into the fourth or critical thermal state 320 based on the temperature being detected by one or more thermal sensors 157.

If the inquiry to decision block 655 is negative, then the "NO" branch is followed to step 660 in which the thermal policy manager module 101 returns the PCD 100 to the third or severe thermal state 315 and the process returns to block 635 of FIG. 6A. Alternatively, if the temperature has dropped by two levels or three levels, the method may proceed back to either block 625 of FIG. 9A or block 435 of FIG. 5.

If the inquiry to decision block 655 is positive, then the "YES" branch is followed to submethod or routine 665 in which the thermal policy manager module 101 activates or request that one or more critical thermal mitigation techniques be activated. The thermal policy manager module 101 in this fourth, critical thermal state 320 may cause the complete shutdown of hardware and/or software modules that are outside of emergency 911 telephone calls and GPS functions. The thermal policy manager module 101 may shut down modules in sequence and/or in parallel depending upon the critical temperatures being monitored by the thermal sensors 157 and the change in temperature being observed by the thermal policy manager module 101.

Subsequently, in decision block 670, the thermal policy manager module 101 may determine if the thermal mitigation techniques applied in routine or submethod 665 were successful to prevent any escalation of temperature of the PCD 100 as detected by the thermal sensors 157. If the inquiry to decision block 670 is negative, then the "NO" branch is followed back to routine or submethod 665.

If the inquiry to decision block 670 is positive, then the "YES" branch is followed to step 675 in which the thermal policy manager module 101 determines the current thermal state of the PCD 100 based on temperature readings supplied by one or more thermal sensors 157. Once the temperature readings are assessed by the thermal policy manager module 101, the thermal policy manager module 101 initiates (or returns to) the thermal state corresponding to the temperature ranges detected by the thermal sensors 157. This means that the sub-method 430 may proceed to block 435 of FIG. 5, block 625 of FIG. 9A, or block 640 of FIG. 9A.

Figure 10:
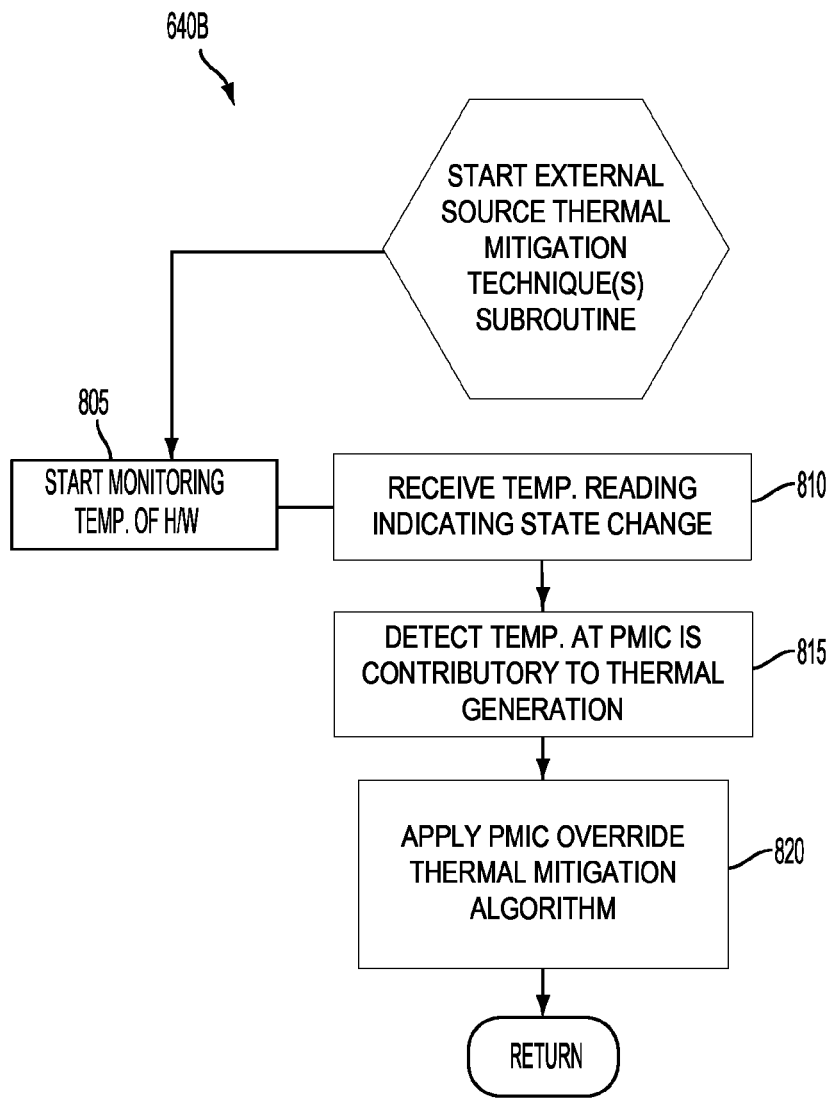
FIG. 10 is a logical flowchart illustrating an exemplary sub-method for reducing thermal loads in a chip of a PCD by managing a thermal energy generating source within the PCD that is external to chip.

FIG. 10 is a logical flowchart illustrating another exemplary sub-method 640B for reducing thermal loads in a chip 102 of PCD 100 by managing a thermal energy generating source within PCD 100 but external to chip 102. This sub-method 640B may be available for any of the thermal policy states illustrated in FIG. 7, such as the QoS thermal policy state 310 and critical thermal policy state 320.

At block 805 of sub-method 640B, the thermal policy manager module 101 may start to monitor temperature of hardware devices present on chip 102. Next, in block 810, the thermal policy manager module 101 may receive a temperature reading from a sensor 157 associated with a hardware device on chip 102 indicating that a temperature threshold has been reached. In block 815, the thermal policy manager 101 may poll a sensor 157 on PMIC 107 to determine whether PMIC 107 is the source of thermal energy responsible for the temperature threshold reading. If not, the sub-method 640B may end and the thermal policy manager module 101 may take optional thermal mitigation measures not associated with PMIC 107 or charge manager 104 functionality.

Next, in block 820, based on its calculations in block 815, the thermal policy manager 101 may implement a control algorithm to override the charging function of the charge manager 104, thus manipulating the recharge of battery 180 in order to mitigate the generation of any detrimental thermal load to chip 102. The sub-method then returns to block 645 of FIG. 9A.

The control algorithm executed by the thermal policy manager module 101 at block 820 may follow the exemplary logic chart illustrated in FIG. 11. Referring to FIG. 11, the various steps or grades of override documented in the table are not intended to represent a comprehensive offering of thermally mitigating measures that may be taken in conjunction with the override of PMIC 107 functionality. Additionally, one skilled in the art will recognize that any combination of the measures suggested in the FIG. 11 table may be mapped to the various states outlined in connection with FIGS. 6-7, as individual PCD 100 embodiments and uses cases may prudently dictate.

In considering the FIG. 11 table, it may be presumed that the thermal policy manager module 101 has duly determined at block 815 of FIG. 10 that the PMIC 107 is, indeed, a source of thermal energy that must be mitigated in order to avoid a detrimental impact on a device within chip 102. Referring to the FIG. 11 table, a series of temperature thresholds, which may correlate to various thermal policy states, are associated with a temperature sensed at an exemplary device residing on chip 102 such as, for example, CPU 110 or GPU 135. When a threshold temperature is sensed, the thermal policy manager module 101 may execute a control algorithm for thermal mitigation that includes the override of various thermal energy generating tasks occurring external to the chip 102.

For example, below a threshold temperature of about 55 degrees Celsius, the thermal policy manager module 101 may not activate or initiate a thermal mitigation technique. This would allow the CPU 110 to continue running at full processing speed. However, above the 55 degree threshold, the thermal policy manager module 101 may reduce the CPU 110 to half speed. This action by the thermal policy manger module 101 may reduce the amount of thermal energy generated by the device itself. This action may also cause the charge manager 104 to dictate that the current supplied to battery 180 in an ongoing recharge operation be reduced. This action by the charge manager may also mitigate the amount of thermal energy generated at the PMIC 107.

If the thermal mitigation measures cause a reduction in the temperature sensed at the chip 102 to below the clearing threshold of about 53 degrees Celsius, the thermal policy manager module 101 may abort the half processing speed and reduced charge current limitations in favor of returning to a full processor speed. If, however, the temperature monitored at chip 102 continues to rise above 65, the thermal policy manager module may apply its algorithm to take more extreme measures including further reduction of the processor 110 speed to one third capacity, abort the ongoing battery recharge and dim the user display, all of which may combine to lower the temperature of the PCD 100.

If the measures work such that a clearing temperature is sensed, then the thermal mitigation measures may be scaled back to previous levels associated with a lesser thermal state. Alternatively, if the thermal mitigation measures do not stem the temperature rise within PCD 100, some thermal policy manager module algorithms may dictate a complete shutdown of PCD 100. In the exemplary illustration, temperatures measured above 85 may trigger a complete shutdown of PCD 100.

Again, the temperature thresholds illustrated in FIG. 11 are offered for explanatory purposes only and, as such, will not limit the scope of a thermal mitigation algorithm to trigger thermal mitigation techniques at the exemplary thresholds offered. One of ordinary skill in the art will recognize that the temperature thresholds, or ranges, at which a given embodiment of a thermal mitigation algorithm, as executed by a thermal policy manager module 101, or its equivalent, may vary according to specific PCD 100 embodiments, thermal policies or user preference.

In view of the inventive system and methods described above, an Original Equipment Manufacturer ("OEM") may program the thermal policy manager module 101 to have a set of thermal states 305, 310, 315, and 320, such as those illustrated in FIGS. 6-7, that may comprise different conditions for initiating one or more thermal mitigation techniques for reducing heat produced by the portable computing device 100. An OEM may select a set of thermal mitigation techniques corresponding to each thermal state (305, 310, 315, 320 of FIG. 6) for the thermal policy manager module 101, such as illustrated in FIG. 7 and FIG. 11.

Each set of thermal mitigation techniques may be unique for a particular thermal state (like 305, 310, 315, and 320 of FIG. 7). The thermal policy manager module 101 may be programmed by the OEM to have thresholds for each thermal mitigation technique, such as illustrated in FIG. 8 or FIG. 11, in which temperature thresholds are used. Each thermal mitigation technique, such as illustrated in FIG. 7, may comprise a unique power reducing algorithm relative to other existing thermal mitigation techniques.

An OEM may program the thermal policy manager module 101 to have one or more magnitudes for power reductions that are associated with a particular thermal mitigation technique. In other embodiments, an OEM may program the thermal policy manager module 101 to have a plurality of thermal mitigation techniques that sacrifice quality of service of the portable computing device in a series of graduated steps for reducing heat produced by the portable computing device.

An OEM may program the thermal policy manager module 101 to activate thermal mitigation techniques in a sequence based on the functions produced by application programs being executed by the portable computing device 100. For example, each algorithm may be activated based on a specific function or task being executed by an application program running on the portable computing device 100.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium.

In the context of this document, a computer-readable medium is an electronic, magnetic, optical, or other physical device or means that may contain or store a computer program and data for use by or in connection with a computer-related system or method. The various logic elements and data stores may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" may include any means that may store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random-access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, for instance via optical scanning of the paper or other medium, then compiled, interpreted or otherwise processed in a suitable manner if necessary, and then stored in a computer memory.

Computer-readable media include both computer storage media and communication media including any medium that facilitates transfer of a computer program from one place to another. A storage media may be any available media that may be accessed by a computer. By way of example, and not limitation, such computer-readable media may comprise any optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made as understood by one of ordinary skill in the art, as defined by the following claims.

What is claimed is:

1. A method for managing thermal energy generation in a portable computing device, the method comprising:

detecting a first temperature reading associated with an application specific integrated circuit ("ASIC") in the portable computing device, wherein the ASIC comprises a multicore processor and the temperature reading indicates that a thermal energy threshold has been reached;

detecting a second temperature reading associated with a power management integrated circuit ("PMIC") in the portable computing device, wherein the PMIC is physically proximate to the ASIC;

determining that the second temperature reading indicates that the PMIC is generating thermal energy contributory to the first temperature reading;

throttling one or more cores in the multicore processor and concurrently overriding a battery recharge function associated with the PMIC, wherein throttling the one or more cores and overriding the battery recharge function comprises application of a first thermal mitigation technique;

detecting if the first thermal mitigation technique has caused the first temperature reading to cool below a threshold, then ceasing to throttle the one or more cores; and detecting if the first temperature reading has exceeded a second threshold, then applying a second thermal mitigation technique.

2. The method of claim 1, wherein the multicore processor is a central processing unit.

3. The method of claim 1, wherein the multicore processor is a graphical processing unit.

4. The method of claim 1, wherein the first thermal mitigation technique comprises reducing the electrical current supplied to a battery.

5. The method of claim 1, wherein the first thermal mitigation technique comprises cycling the electrical current supplied to a battery.

6. A computer system for managing thermal energy generation in a portable computing device, the system comprising:

thermal policy manager module operable to:

detecting a first temperature reading associated with an application specific integrated circuit ("ASIC") in the portable computing device, wherein the ASIC comprises a multicore processor and the temperature reading indicates that a thermal energy threshold has been reached;

detecting a second temperature reading associated with a power management integrated circuit ("PMIC") in the portable computing device, wherein the PMIC is physically proximate to the ASIC;

determining that the second temperature reading indicates that the PMIC is generating thermal energy contributory to the first temperature reading;

throttling one or more cores in the multicore processor and concurrently overriding a battery recharge function associated with the PMIC, wherein throttling the one or more cores and overriding the battery recharge function comprises application of a first thermal mitigation technique;

detecting if the first thermal mitigation technique has caused the first temperature reading to cool below a threshold, then ceasing to throttle the one or more cores; and detecting if the first temperature reading has exceeded a second threshold, then applying a second thermal mitigation technique.

7. The computer system of claim 6, wherein the multicore processor is a central processing unit.

8. The computer system of claim 6, wherein the multicore processor is a graphical processing unit.

9. The computer system of claim 6, wherein the first thermal mitigation technique comprises reducing the electrical current supplied to a battery.

10. The computer system of claim 6, wherein the first thermal mitigation technique comprises cycling the electrical current supplied to a battery.

11. A computer system for managing thermal energy generation in a portable computing device, the system comprising:
- means for detecting a first temperature reading associated with an application specific integrated circuit ("ASIC") in the portable computing device, wherein the ASIC comprises a multicore processor and the temperature reading indicates that a thermal energy threshold has been reached;
- means for detecting a second temperature reading associated with a power management integrated circuit ("PMIC") in the portable computing device, wherein the PMIC is physically proximate to the ASIC;
- means for determining that the second temperature reading indicates that the PMIC is generating thermal energy contributory to the first temperature reading;
- means for throttling one or more cores in the multicore processor and concurrently overriding a battery recharge function associated with the PMIC, wherein throttling the one or more cores and overriding the battery recharge function comprises application of a first thermal mitigation technique;
- means for detecting if the first thermal mitigation technique has caused the first temperature reading to cool below a threshold, then ceasing to throttle the one or more cores; and
- means for detecting if the first temperature reading has exceeded a second threshold, then applying a second thermal mitigation technique.

12. The computer system of claim 11, wherein the multicore processor is a central processing unit.

13. The computer system of claim 11, wherein the multicore processor is a graphical processing unit.

14. The computer system of claim 11, wherein the first thermal mitigation technique comprises reducing the electrical current supplied to a battery.

15. The computer system of claim 11, wherein the first thermal mitigation technique comprises cycling the electrical current supplied to a battery.

16. A computer program product comprising a non-transitory computer readable medium having a computer readable program code embodied therein, said computer readable program code adapted to be executed to implement a method for managing thermal energy generation in a portable computing device, said method comprising:
- detecting a first temperature reading associated with an application specific integrated circuit ("ASIC") in the portable computing device, wherein the ASIC comprises a multicore processor and the temperature reading indicates that a thermal energy threshold has been reached;
- detecting a second temperature reading associated with a power management integrated circuit ("PMIC") in the portable computing device, wherein the PMIC is physically proximate to the ASIC;
- determining that the second temperature reading indicates that the PMIC is generating thermal energy contributory to the first temperature reading;
- throttling one or more cores in the multicore processor and concurrently overriding a battery recharge function associated with the PMIC, wherein throttling the one or more cores and overriding the battery recharge function comprises application of a first thermal mitigation technique;
- detecting if the first thermal mitigation technique has caused the first temperature reading to cool below a threshold, then ceasing to throttle the one or more cores; and
- detecting if the first temperature reading has exceeded a second threshold, then applying a second thermal mitigation technique.

17. The computer program product of claim 16, wherein the multicore processor is a central processing unit.

18. The computer program product of claim 16, wherein the multicore processor is a graphical processing unit.

19. The computer program product of claim 16, wherein the first thermal mitigation technique comprises reducing the electrical current supplied to a battery.

20. The computer program product of claim 16, wherein the first thermal mitigation technique comprises cycling the electrical current supplied to a battery.

* * * * *